United States Patent [19]

Kribbs

[11] Patent Number: 4,771,512

[45] Date of Patent: Sep. 20, 1988

[54] TOOL FOR PEELING AND DEVEINING SHRIMP

[76] Inventor: Wayne A. Kribbs, 1700 S. Shoshone, Denver, Colo. 80223

[21] Appl. No.: 48,264

[22] Filed: Jul. 6, 1987

[51] Int. Cl.⁴ ............................................. A22C 29/02
[52] U.S. Cl. ........................................... 17/72; 17/73
[58] Field of Search .......................... 17/71, 72, 73, 75

[56] References Cited

U.S. PATENT DOCUMENTS

| | | | |
|---|---|---|---|
| 2,594,205 | 4/1952 | Paoli | 17/72 X |
| 4,048,696 | 9/1977 | Maschio | 17/73 X |
| 4,477,943 | 10/1984 | Grush, Jr. | 17/75 |

Primary Examiner—Willie G. Abercrombie
Attorney, Agent, or Firm—Kyle W. Rost

[57] ABSTRACT

A shrimp peeler and deveiner provides a hooked handle that fits over the hand of the user and further provides an upwardly angled, pointed cylindrical probe that is inserted into the shrimp to perform the peeling and deveining process. The probe is attached to the handle near the bottom of a grip portion that crosses the user's palm and is kept in ready, grippable position by the hooked part of the handle, allowing the user to open his hand for manual shell peeling without having to set down the tool.

16 Claims, 2 Drawing Sheets

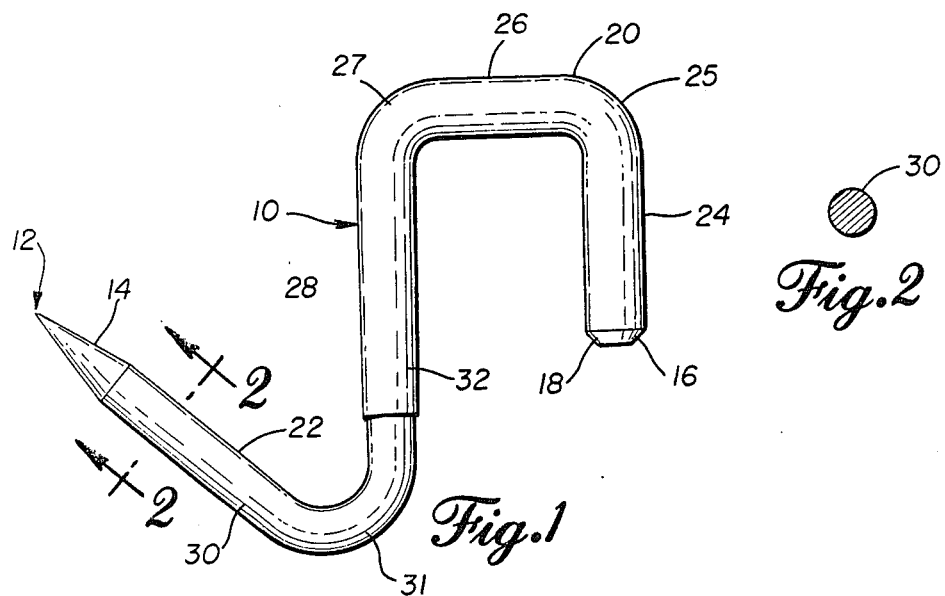
Fig.1
Fig.2
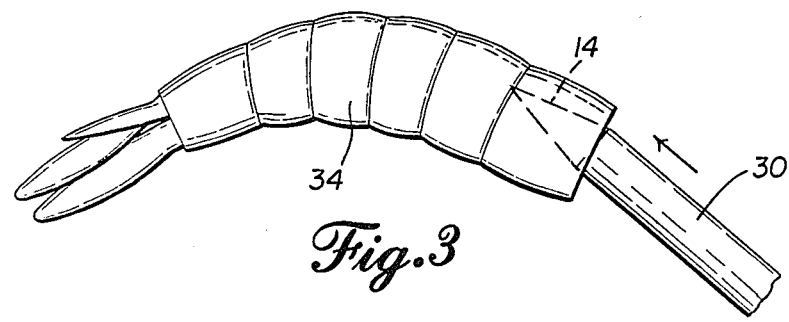
Fig.3
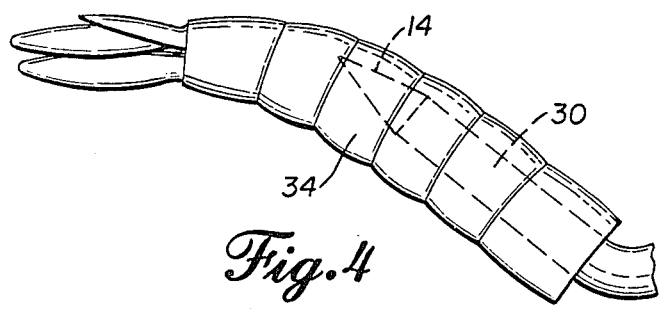
Fig.4

TOOL FOR PEELING AND DEVEINING SHRIMP

BACKGROUND OF THE INVENTION

1. Field of the Invention

The invention relates generally to butchering, especially to butchering of marine animals. More specifically, the invention relates to peeling means and deveining means for crustaceans, especially shrimp. The invention also relates to processes for shelling shrimp.

2. Description of the Prior Art

It is reported that over 700 million pounds of shrimp are sold in the United States each year, of which only 10% are prepeeled. In the food industry, no presently known peeler is commonly accepted because none is believed to work any faster than standard peeling by hand, followed by manual deveining with a boning knife. Thus, the need for a capable peeler still exists.

A number of patented tools and processes are known that purport to assist in hand peeling and deveining shrimp. Generally, these tools are inserted in the sand channel of the shrimp to split the channel and partially remove the sheel. However, the final stage of peeling the shell inevitably requires the use of the hands. In this aspect the tools of the prior art become inefficient, as before the hand can assist in final shell removal, the tool must be set down or otherwise removed from operative position in the hand. While the restaurant customer may be inconvenienced in only a small way, the problem is of far greater economic impact on to a commercial shrimp preparer, to whom rapid processing is important.

As an example of known patent art, U.S. Pat. No. 4,048,696 to Maschio discloses a shrimp sheller composed of a pointed probe that is inserted between the shell and the flesh. As the probe is moved toward the tail of the shrimp, a perpendicular shank of the probe slices through the shell, splitting it for easy removal. The shank also connects the probe to an offset handle. Notably, the handle is to be gripped in the user's hand, which requires that the entire probe be set down when the user wishes to use that same hand to assist in removing the shell. In addition, the right angles formed between the shank, the probe, and the handle are inappropriate for efficient use of the tool.

U.S. Pat. No. 4,553,287 to DeSordi et al. discloses a tapered tool that is inserted in the full length of the shrimp's vein channel to rupture and remove the shell. The tool is grasped in the user's hand and must be set down before that hand can be used conveniently for assisting in completing the shelling by hand.

U.S. Pat. No. 2,647,278 to Weinberger discloses a device that removes a shrimp sheel by a scissors action. The device tears the shell outwardly and does not purport to devein the shrimp. Most notably, this device must be set down before the user's hand can be used to finish the shelling process.

Thus, the patent art confirms the problem that the user must set down the shelling tool or otherwise remove it from operative position in order to finish the shelling process by hand. Anyone having shelled shrimp even while dining knows that the shells can be stubborn and will not spring away conveniently, notwithstanding the optomistic statements to the contrary that appear in the promotions of some shelling tools. Thus, it remains a desirable goal to provide an efficient shelling tool that permits both hands to be used for completing shell removal, without requiring the tool to be removed from operative, ready position.

To achieve the foregoing and other objects and in accordance with the purpose of the present invention, as embodied and broadly described herein, the shrimp shelling and deveining tool of this invention may comprise the following.

SUMMARY OF THE INVENTION

Against the described background, it is therefore a general object of the invention to provide an improved shrimp shelling and deveining tool that hangs comfortable between the thumb and forefinger and never leaves this position.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to the invention, a tool for peeling and deveining shrimp has a handle portion configured to have a hook-shaped profile and adapted for, in use, hooking over the hand of a user between the thumb and forefinger. A probe portion is connected to the handle portion and angles upwardly therefrom at an acute angle, the forward end of the probe portion having a tapered tip for, in use, insertion into the headless end of a shrimp body for peeling and deveining the shrimp.

According to a further aspect of the invention, a tool for peeling and deveining shrimp is designed to have a cylindrical probe with a pointed forward end for insertion into the headless end of a shrimp body to devein and shell the shrimp. A hand gripable handle section is connected at its lower end to the rear end of the probe at an acute angle for, in use, hand engagement by a user. A hand-edge crossing top section is connected at its forward end to the top end of the hand gripable handle section for, in use, resting against the top of a user's hand between the thumb and forefinger. A rear handle section is connected at its upper end to the rear end of said top section and depends therefrom for, in use, engaging the back of the user's hand to maintain the hand gripable handle section in a position ready to be gripped by the user.

The accompanying drawings, which are incorporated in and form a part of the specification illustrate preferred embodiments of the present invention, and together with the description, serve to explain the principles of the invention, In the drawings:

BRIEF DESCRIPTION OF THE DRAWINGS

FIG. 1 is a side elevational view of the tool for peeling and deveining shrimp, showing an embodiment constructed mainly of stainless steel.

FIG. 2 is a cross-sectional view taken along the plane of line 2—2 of FIG. 1, showing the cylindrical cross-section of the tool.

FIG. 3 is a detail view similar to FIG. 1, but showing the operation of the tool with the point of the tool being inserted into the headless end of a shrimp, with the arrow showing the direction of tool motion with respect to the shrimp.

FIG. 4 is a view similar to FIG. 3, showing the point of the tool pushed to the desired full depth, to the last shell segment or tail.

DESCRIPTION OF THE PREFERRED EMBODIMENTS

Figure 5:
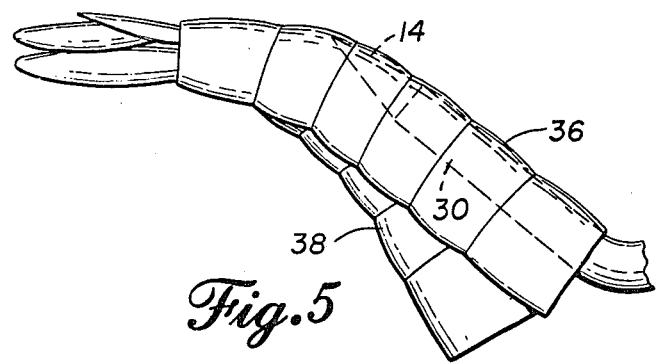
FIG. 5 is a view similar to FIG. 4, showing the tool being pulled or lifted gently to raise the shell from the fleshy body of the shrimp, leaving only a minor attachment of the shell.

With reference to the drawings and in particular FIG. 1, the tool 10 may be formed from a rod of type 304 stainless steel having a diameter of ⅜ inch and a length of 9¼ inches. The rod, which is cylindrical in cross-section, as shown in FIG. 2, has a front end 12 that is formed into a point at the apex of a conic taper 14. The opposite or rear, free end 16 of the rod is squarely cut and may have chamfered edges 18. The rod is configured into the tool by bending it into a series of relatively angled sections lying in a single plane and defining a handle portion 20 and a probe portion 22.

Figure 6:
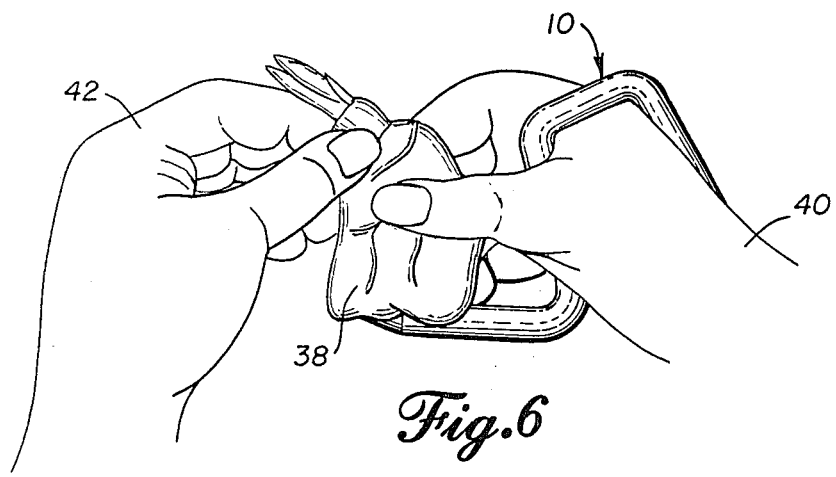
FIG. 6 is a perspective view of the tool as freely hung on the user's hand, while the user pulls the shell free with two fingers to complete the peeling process.

The handle is generally hook-shaped or U-shaped so as to be adapted to fit over the thumb-edge of the hand, as shown in FIG. 6, and may be defined in the preferred embodiment by three substantially perpendicular sections. As described from the rear end of the rod to the front end, the first or rear section 24, beginning with the free end 16, extends along a straight axis for a distance on the order of two inches. The second or top section 26 joins the concluding end of the first section at a smooth curve 25 having, for example, a ¼ inch inside radius. The top section extends forwardly, perpendicular to the rear section, for a distance suitable to create a hand-receiving gap between the first and third sections, said gap having a width of, for example 1⅜ inches. The top section then is joined to a third, front section 28 at a smooth curve 27, similar to curve 25. The front section 28, depends perpendicularly from the top section, parallel to the first section. This third handle section may extend for a distance of 3½ inches and is adapted to pass accross the palm of the hand.

Together, the three handle sections can be seen in the drawings to define an open bottomed hook or inverted U shape, wherein the third section is receivable within the grasp of the hand and constitutes the grippable portion of the handle. The the second section passes over the top of the hand between the forefinger and thumb, and the first section passes over the back of the hand. As viewed in FIG. 1, the first and third sections are parallel and vertical, while the second section is perpendicular to both sections 24 and 26 and is horizontal.

The probe portion is defined by a section of the rod that continues forward from the handle portion and has an overall length of, for example, 2⅜ inches. The point 12 at the forward, free end of the probe portion is at the apex of a symmetrical conic taper 14 having a length of, for example, ¾ inch. The conic taper is connected by a shank portion 30 to a smoothly curved junction 31 to the lower end of the third handle section. Curve 31 may have an inside radius of, for example, ⅜ inch. The longitudinal axis of the probe portion is raised at a forward, acute angle of, for example, 40° from the horizontal, which corresponds to a 50° inside angle to handle section 28.

The handle portion of the stainless steel tool may be coated with a plastic or rubber sheath 32, such as a polyvinylchloride plastic. The tool also may be formed from a fiber plastic rod of similar measurements. The stainless steel tool has the advantage of requiring no subsequent sharpening and can last indefinitely. The plastic tool is durable and of reasonable cost for the home consumer.

As shown in FIG. 6, the tool is hooked over one hand while the other hand holds the shrimp 34. In use, the point of the tool is inserted between the interior of the shell 36 and the body 38 of the shrimp. As shown in FIG. 3, the point 12 floats between the body and shell as the tool is moved in the direction of the arrow, toward the tail of the shrimp. FIG. 4 illustrates the full penetration of the tool toward the tail of the shrimp. At that point, the tool is pulled gently upwardly, away from the body of the shrimp, separating most of the shell from the body as shown in FIG. 5. Finally, as shown in FIG. 6, the tool is allowed to hang freely from the user's hand 40, permitting that hand and the other hand 42 to cooperate in pulling the shell free. As also evident from figure 6, the tool remains substantially in operative position while hanging from hand 40 and is in ready position to be used on the next shrimp.

This tool is for the purpose of peeling and deveining shrimp. The peeling process can be described in the following sequence of instructions:

1. Hold tool loosely and insert at the base of shrimp where head is removed. All shrimp are processed this far, head removed.
2. At a comfortable 54° angle the process can begin.
3. Glide the point up the vein side of the shrimp to the tail.
4. Pull the tool to your body and release the light grip.
5. The tool will have removed the shell 80% and totally deveined the shrimp.
6. The peeling hand still holds the tool, but with its unique handle will hang at an ******* degree so when the next shrimp is started the tool does not have to be picked up agan, or adjusted to be comfortable. With fingers free to function shell removal is simple. All tools require shell removal by hand. All tools are an aid and not one does not require fingers usage.
7. The fingers simply pull the finished shell off with vein intact.
8. Pick up next shrimp and start at step 1 again.

Tool creates a furrow, splitting the vein. With no blade there is no danger of deep incision. Handle provides comfort and feasibility.

Tool:
1. It is one piece.
2. Cylindrical
3. Stainless, has rubber handle.
4. Plastic needs no rubber.
5. It has no blades.
6. It comes to a point.
7. Totally unique process.
8. Easy cleaning.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

I claim:

1. A tool for peeling and deveining shrimp, comprising:
 a handle portion configured to have a hook-shaped profile and adapted for, in use, hooking over the hand of a user between the thumb and forefinger; and
 a probe portion connected to said handle portion and angling upwardly therefrom at an acute angle, the forward end of the probe protion having a tapered tip for, in use, insertion into the headless end of a shrimp body for peeling and deveining the shrimp.

2. The tool of claim 1, wherein said handle portion comprises a front, grippable section, positionable to be received, in use, across the palm of the user's hand for hand-engagement during the peeling and deveining usage.

3. The tool of claim 2, wherein said probe is joined to said grippable handle section, extends forwardly therefrom, and defines an acute inside angle therewith.

4. The tool of claim 3, wherein said inside angle is approximately forty degrees.

5. The tool of claim 1, wherein said handle portion comprises a top section and a rear section, the top section connecting the rear section and grippable section and maintaining the grippable section and rear section at a predetermined mutual spacing suitable to receive the width of a hand, such that the handle portion is capable of maintaining the grippable portion across the palm of the user even when the hand is partly open for manual removal of a shrimp shell.

6. The tool of claim 5, wherein said top section maintain the grippable section and rear section at a relative spacing of approximately one and three-eights inches.

7. The tool of claim 5, wherein said grippable section and said rear section are mutually substantially parallel.

8. The tool of claim 5, wherein said probe portion is joined to said grippable section of the handle at the end opposite from said top section.

9. The tool of claim 1, wherein said probe portion is cylindrical in transverse cross-section and the tapered end thereof is formed into a substantially symmetrical conic taper.

10. The tool of claim 9, wherein said probe portion comprises a shank connecting said conic taper to said handle portion.

11. A tool for peeling and deveining shrimp, comprising:
 a cylindrical probe having a pointed forward end for insertion into the headless end of a shrimp body to devein and shell the shrimp;
 a hand grippable handle section connected at its lower end to the rear end of said probe at an acute angle for, in use, hand engagement by a user;
 a hand-edge crossing top section connected at its forward end to the top end of the hand grippable handle section for, in use, resting against the top of a user's hand between the thumb and forefinger; and
 a rear handle section connected at its top end to the rear end of said top section and depending therefrom for, in use, engaging the back of the user's hand to maintain the hand grippable handle section in a position ready to be gripped by the user.

12. The tool of claim 11, wherein the centerlines of said probe, hand grippable section, top section, and rear section are substantially coplanar.

13. The tool of claim 11, wherein said hand grippable section is approximately three and one-half inches long.

14. The tool of claim 11, wherein said top section is approximately one and three-eights inches long.

15. The tool of claim 11, wherein said probe comprises a shank of approximately two and three-eighths inches length and three-eights inch diameter and a tapered conic section of approximately three-quarters inch length leading to said pointed end.

16. The tool of claim 15, wherein said tapered conic section is a symmetrical taper.

* * * * *